UNITED STATES PATENT OFFICE.

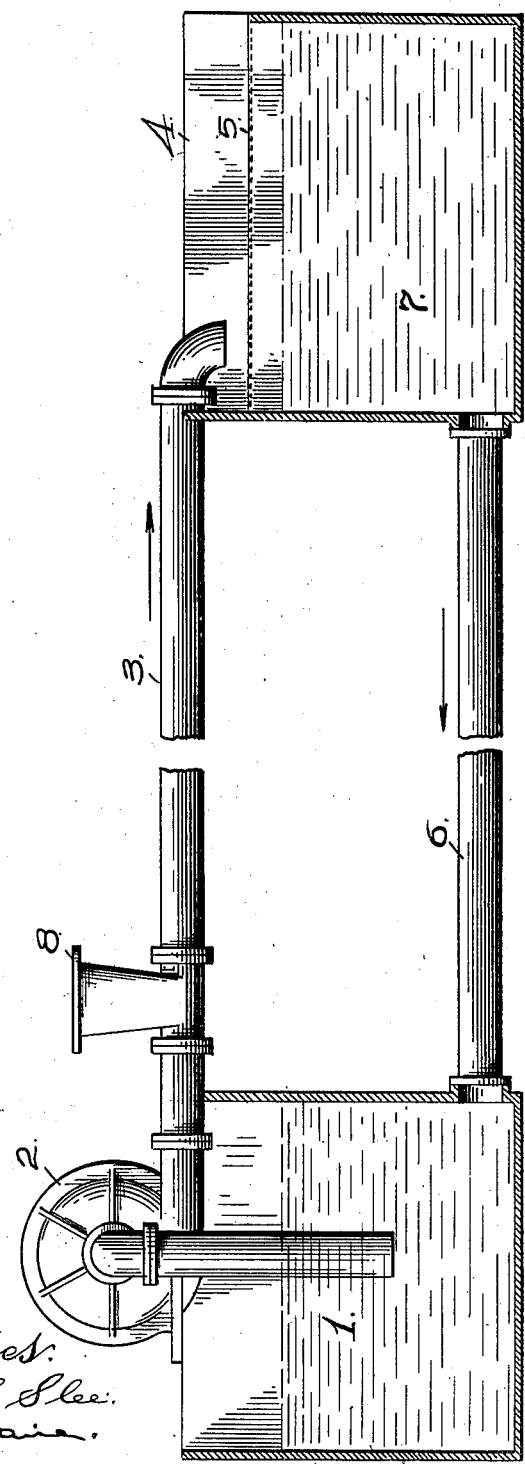

JOHN STAUFFER, OF OAKLAND, CALIFORNIA, ASSIGNOR TO SAN FRANCISCO SALT REFINERY, OF SAN FRANCISCO, CALIFORNIA, A CORPORATION OF CALIFORNIA.

METHOD OF TRANSPORTING SALT.

1,091,251.    Specification of Letters Patent.    Patented Mar. 24, 1914.

Application filed August 21, 1911. Serial No. 645,079.

*To all whom it may concern:*

Be it known that I, JOHN STAUFFER, a subject of Germany, residing at Oakland, in the county of Alameda and State of California, have invented certain new and useful Improvements in Methods of Transporting Salt, of which the following is a specification.

The hereinafter described invention relates to an improved method of transporting or conveying salt from a distant point to a suitable place of deposit, the object being to facilitate the handling of the salt and at the same time to provide against the material being exposed during transportation to dirt, dust, and other foreign substances deposited therein under the present manner of handling the same, and by so doing maintaining the salt in a clean condition.

The improved method of transportation consists in forming a brine solution thoroughly impregnated or charged with salt to such a point of saturation as to repel further absorption of sodium chlorid crystals, which solution so formed is employed or utilized as the propelling medium for the salt to be conveyed or transported.

This solution is forced through a suitable return pipe line connection by means of a force pump, and as the solution is pumped from the feed station to the place of deposit, the salt to be transported is fed into the flowing body of the brine solution, and carried by such solution to the desired place of deposit. Inasmuch as the propelling solution is impregnated to its full point of saturation, the salt crystals delivered therein remain in suspension, so that the solution is discharged at the end of the pipe line for the return to the feed or pump station. At the discharge point for the charged solution, the salt crystals are separated from the propelling medium in any suitable manner, while the saturated solution or brine is returned to the pump station. Preferably, at the discharge end of the pump line, the conveying solution passes into a sump through a reticulated covering, the mesh of which is of such fineness as to retain or hold on the surface thereof the salt crystals held in suspension within the propelling or conveying solution, thus separating the salt crystals from the impregnated solution.

A simple and effective apparatus for successfully carrying out the described method is disclosed in the accompanying sheet of drawings, wherein is illustrated a broken view in side relation of the return pipe line, a centrifugal pump at the feed end thereof for forcing the conveying solution therethrough to the discharge end thereof, and the receiving surface for separating the salt crystals from the solution passing therethrough.

In the drawings, the numeral 1 indicates a sump located at the feed or pumping station for the conveying of the solution; 2 a centrifugal pump extended therein; 3 the upper run of the pipe line extended to the distant discharge station 4, where the salt is to be deposited; 5 the collecting or separating surface formed of meshed material onto which the propelling solution for the salt crystals is discharged, and 6 the under run of the pipe line for returning the discharged solution from the well 7 to the sump 1.

The saturated solution contained within the sump 1 is raised therefrom by the pump 2 and forced through the pipe line section 3 onto the mesh covering or separator 5 located at the discharge station 4. As the solution runs through the covering or collecting surface 5 into the well 7, the salt crystals carried thereby in suspension are held back by the covering or collecting surface 5 and so separated from the conveying vehicle. From the well 7, the solution is returned to the sump 1 by the return section 6 of the pipe line. As the solution is forced into the pipe line section 3 at the feed station, the salt or salt crystals to be conveyed to the discharge station 4 is fed into the flowing solution through a feed hopper 8, and conveyed thereby toward the discharge station, being preferably delivered onto a collecting or separating surface 5, the solution passing therethrough into the well 7 flowing back into the sump 1 through the return section 6 of the pipe line. A continuous circulation of the propelling solution is thus maintained between the receiving station and the discharge station or place of deposit for the transported salt.

While the described apparatus is a convenient arrangement of working parts for successfully carrying out the invention, still, any other suitable form of mechanism may be utilized for maintaining in action the propelling solution for the salt or salt crystals.

By the described method of transporting a body of salt to a suitable place of deposit through the medium of an impregnated solution, saturated to its full capacity of absorption, the salt is maintained in a clean condition, free of foreign deposits, and transferred with greater rapidity, at a minimum expense, and with less handling than where conveyed in sacks or vehicles to the refining station or place of deposit.

Having thus described the invention what is claimed as new and desired to be protected by Letters Patent is:—

1. The method of transporting salt to a place of deposit which consists in forming a brine solution impregnated with salt to its full capacity, forcing the same toward the place of deposit, and feeding into the solution the salt to be transported.

2. The method of transporting salt to a place of deposit the step of which consists in feeding into a flowing solution of brine impregnated with salt to its full capacity of absorption, the salt to be transported.

3. The method of transporting salt to a place of deposit, which consists in feeding into a continuous flowing brine solution impregnated with salt to its full capacity of absorption the salt to be transferred, and separating from the solution at the place of deposit the salt crystals carried thereby in suspension.

4. The method of transporting salt from a feed station to a distant place of deposit, which consists in establishing between the feed station and the place of deposit a flowing stream of brine solution impregnated with salt to its full capacity of absorption, feeding into said stream the salt to be transported, separating from flowing stream adjacent its point of discharge the salt crystals held in suspension, and returning the brine solution with the salt crystals removed therefrom to the feed station.

In testimony whereof I have signed my name to this specification in the presence of two subscribing witnesses.

JOHN STAUFFER.

Witnesses:
N. A. ACKER,
D. B. RICHARDS.